April 22, 1952  J. M. PESTARINI  2,593,482
ELECTRIC POWER SYSTEM
Filed Nov. 4, 1946  3 Sheets-Sheet 1

INVENTOR
Joseph M. Pestarini
BY
ATTORNEY

April 22, 1952  J. M. PESTARINI  2,593,482
ELECTRIC POWER SYSTEM
Filed Nov. 4, 1946  3 Sheets-Sheet 3

INVENTOR.

Patented Apr. 22, 1952

2,593,482

UNITED STATES PATENT OFFICE 2,593,482

ELECTRIC POWER SYSTEM

Joseph Maximus Pestarini, Staten Island, N. Y.

Application November 4, 1946, Serial No. 707,700

10 Claims. (Cl. 171—119)

The invention relates to an electric power system comprising a plurality of sources of electric power and a plurality of independently operating motors. Particularly it relates to an electric power system for energizing the motive power of mobile or stationary equipment. The invention may be applied, for instance, to a diesel electric locomotive provided with an auxiliary battery, or to an industrial plant with engines as prime movers and a battery as an emergency source.

An object of the invention is to provide an improved power system which permits simultaneous operation of motors independently of one another, irrespective of their speed, the said motors being supplied with current from one or more sources.

Another object of this invention is to provide a power system including motors and a plurality of sources of energy for energizing said motors and differing from one another, said motors being adapted to be energized by one or more of said sources of energy at any predetermined time.

Still another object of this invention is to provide a power system including a plurality of motors, a battery, and generators, wherein said generators simultaneously provide power for said motors and for charging said batteries.

Still a further object of this invention is to provide a power system including a plurality of motors, a plurality of different sources of energy for energizing said motors and improved means for selectively connecting each of said sources of energy to said motors, the transition from one source of energy supply to another being effected with a minimum amount of switch gear.

Yet another object of this invention is to provide a power system including a motor and a source of energy for said motor and improved means for starting said motor in the absence of resistors.

The invention is described, reference being made to the accompanying drawings.

Figure 1:
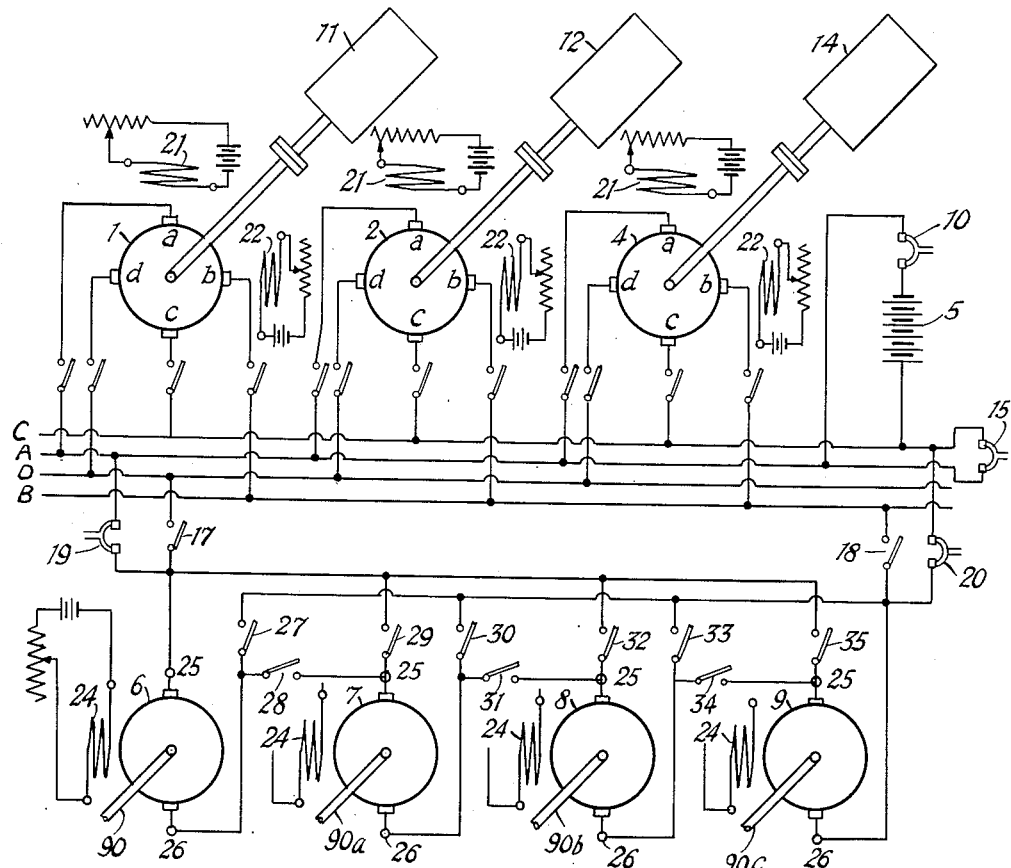
Figures 2, 3, 4:
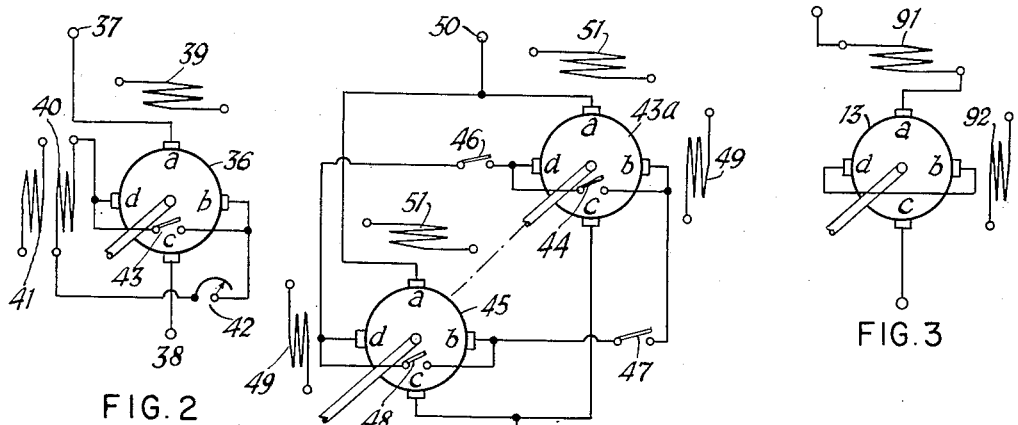
Figure 5:
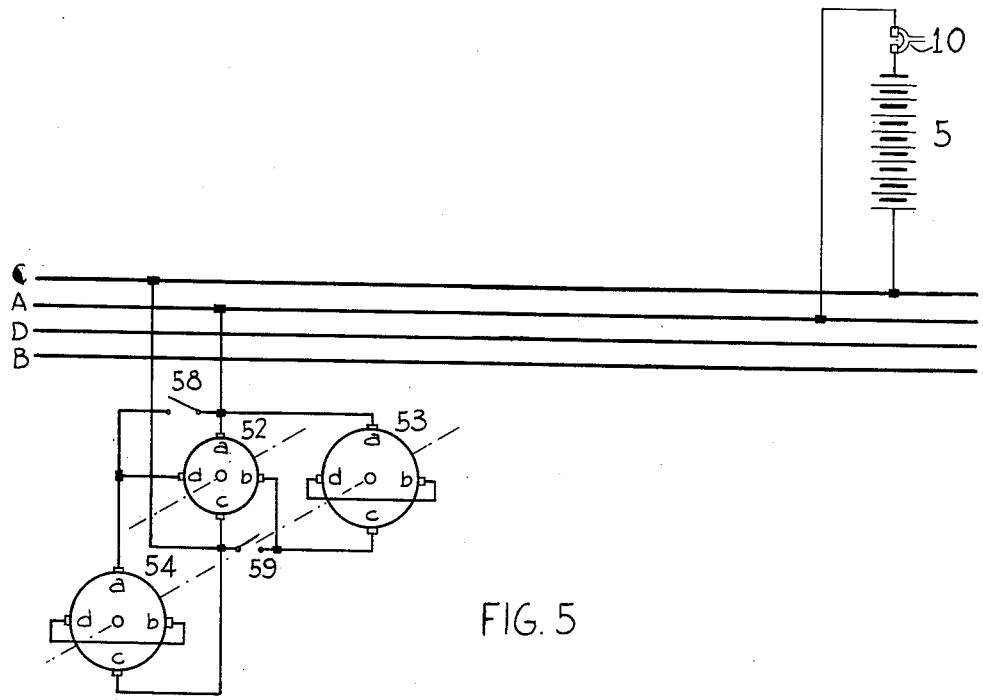
Figure 6:
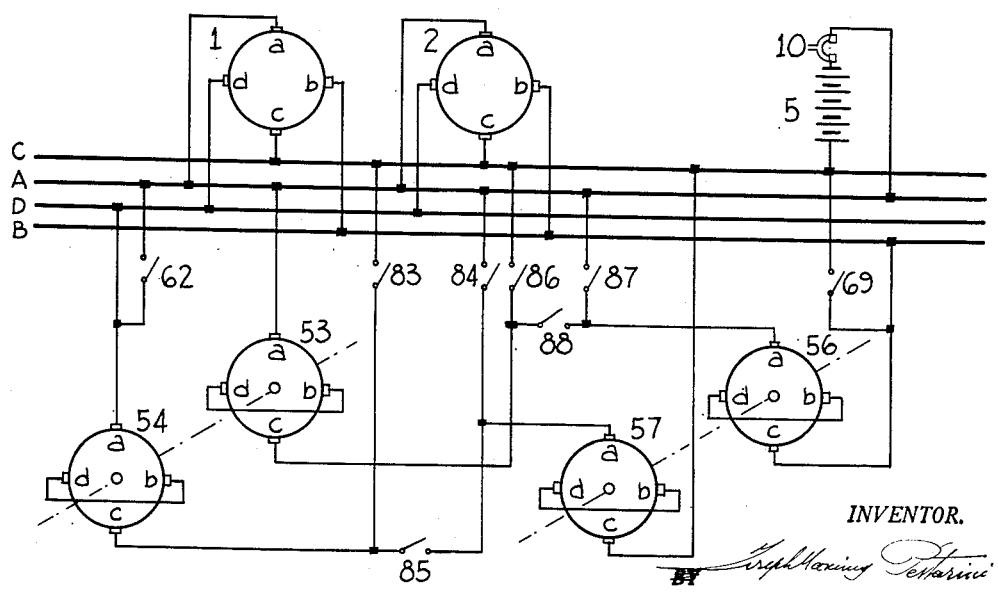
Figure 7:
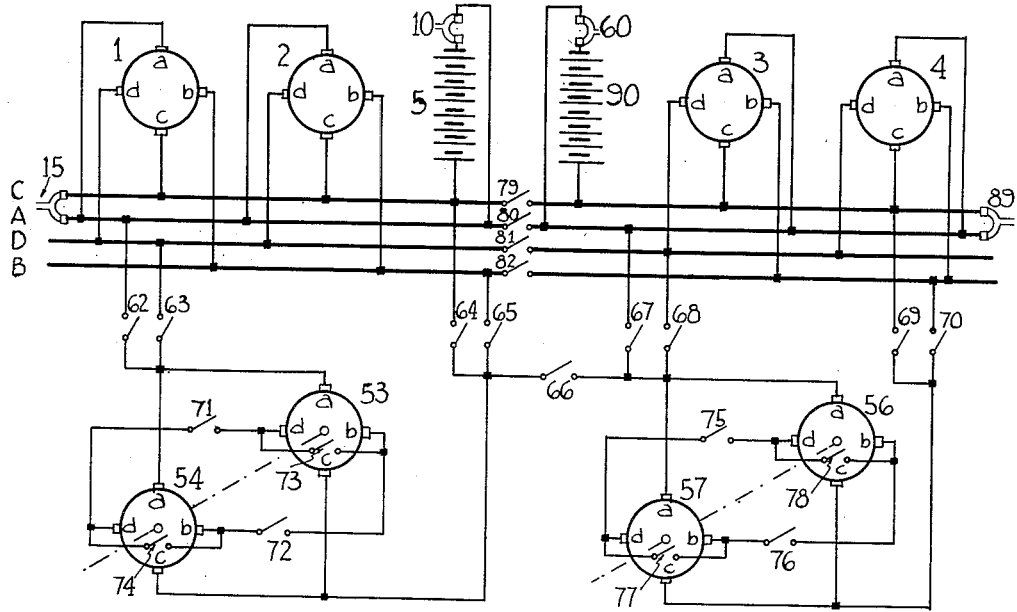
Figure 8:
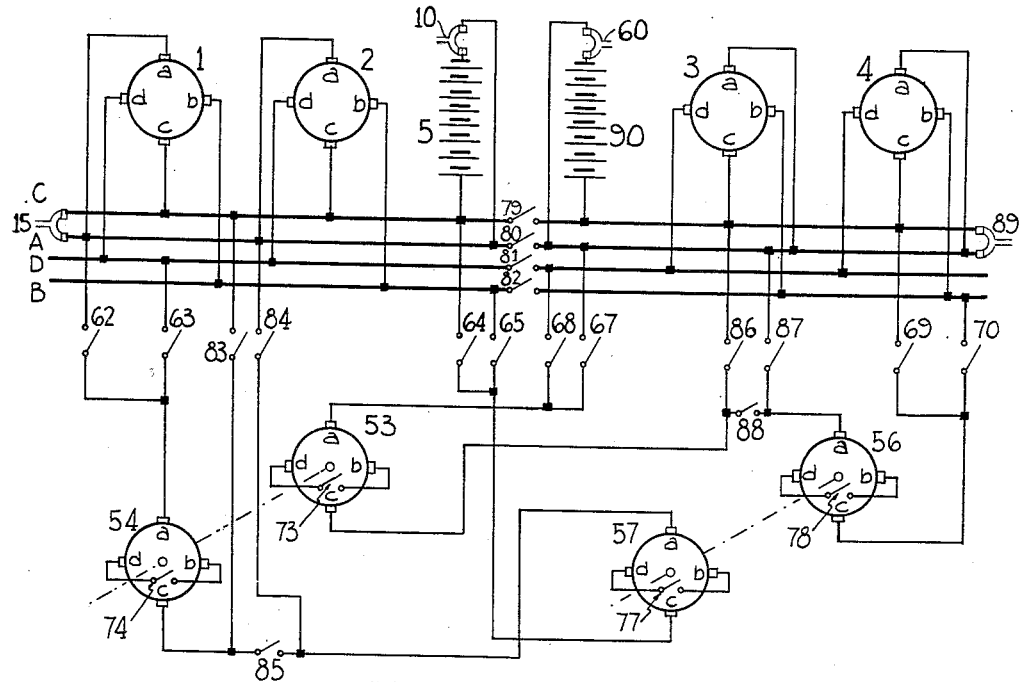

Figure 1 shows a power system embodying the invention and including a plurality of motors and means for energizing said motors including generators and a battery; Figure 2 shows a special motor metadyne which may be used in lieu of the motors shown in Figure 1; Figure 3 shows another type of motor metadyne similar to that shown in Figure 2 and illustrating a modification thereof; Figure 4 shows a further modification of the motor shown in Figure 2; Figure 5 shows the interconnection of motors and metadynes similar to that shown in Figure 1 and illustrating a modification thereof; Figure 6 shows a modification of the scheme shown in Figure 1; Figure 7 shows a scheme similar to that of Figure 1 and including two batteries and Figure 8 shows a modification of the scheme shown in Figure 7.

The metadyne, hereinafter referred to, is an electric direct current machine having more than two brushes per cycle, the flux created by the current traversing the armature through a pair of brushes inducing an electromotive force between the brushes of another pair of the same cycle. The number of cycles of an electric machine is defined as the number of times that an observer, accomplishing a complete revolution along the air gap, sees all electrical and magnetic parts repeated in the same disposition.

The metadyne has been described in many United States Patents of the applicant, see for instance, Patents Nos. 2,055,240; 1,987,417; 2,038,380; 2,049,389 and 2,079,465. A more complete description has been given in Revue Generale de l'Electricite, on March 8th and 15th, August 16th and 23rd, November 22nd and 29th and December 6th, 1930, Paris.

In Figure 1 is shown a plurality of similar generator metadynes indicated at 1, 2, 4. Each of the metadynes includes a set of primary brushes $a$, $c$ and a set of secondary brushes $b$, $d$. The brushes on each of the metadynes 1, 2 and 4 are connected to bus bars C, A, D, B, respectively, through conventional switches. Each of the metadynes is provided with a stator winding 21 and a stator winding 22 for controlling the output current traversing the primary and the secondary brushes respectively.

A storage battery 5 is connected to the bus-bars C and A, by means of the contactor 10. The generator metadyne 1 is driven by a diesel engine 11, by means of mechanical coupling 23; similarly the generator metadynes 2 and 4 are driven by the diesel engines 12 and 14, respectively. Means for providing motive power take the form of dynamos 6, 7, 8, 9. The dynamo 6 includes terminals 25, 26. Dynamos 7, 8 and 9 are provided with similar terminals. The terminals 25 of the dynamos 6, 7, 8 and 9 are connected to bus-bar A through a contactor 19 and switches 29, 32 and 35. The terminal 26 of the dynamo 6 and the corresponding terminals of dynamos 7, 8, 9, are connected to bus-bar C through switches 27, 30, 33 and contactor 20. The dynamos 6, 7, 8 and 9 are connected in series with each other and to bus-bars D and B through switches 17, 28, 31, 34 and 18.

Each of the dynamos 6, 7, 8 and 9 is provided with a field winding 24 energized by a battery and rheostat, for controlling the torque and speed of said dynamo.

If switches 17, 28, 31, 34, 18 and 10 are closed and switches on each of the generator metadynes 1, 2, 4 are also closed, leaving remaining switches open, then the dynamos are connected in series with each other and between the brushes b, d of the generator metadynes 1, 2, 4. The dynamos 6, 7, 8 and 9 will operate independently of each other by controlling the current in their respective field windings 24. Simultaneously, the generator metadynes 1, 2 and 4 driven by the engines 11, 12 and 14, respectively, will charge the battery 5. The generator metadynes 1, 2, 4, which are connected as hereinabove described, may be referred to as D generator metadynes and is more specifically described in application, Serial Number 701,793, filed October 7, 1946, now Patent 2,498,765. As explained in said application, the currents created by the metadynes 1, 2, 4 and traversing the primary and second brushes thereof respectively, may be controlled independently of one another, by means of their respective stator windings 21, 22. Thus the battery 5 may either absorb energy from metadynes 1, 2, 4 or it may supply energy to the motors 6, 7, 8, 9 through the metadynes 1, 2, 4.

The circuits indicated in Figure 1 may be operated whereby the metadynes 1, 2, 4 supply energy to the dynamos 6, 7, 8 and 9; the battery 5 being disconnected. To this end, contactor 10 is opened and contactor 15 bridging bus-bars C, A, is closed.

If it is desired that the dynamos 6, 7, 8 and 9 be operated from the battery 5 only, then the switches 17, 19, 28, 31 and 34 are open. In this case either the dynamos must operate at the same speed or at different speeds within the limits allowed by the control of their respective field excitations.

For starting the said dynamos while they are connected to the battery 5 only, one or more of the generator metadynes 1, 2, 4 may be operated as transformer metadynes to bring the voltage of the dynamos gradually from zero value to the value of the battery voltage. For instance, the metadyne 1 may be used as transformer metadyne by disconnecting the same from engine 11 through the mechanical coupling 23 and by connecting its primary brushes a, c, to the battery 5 and by connecting the dynamos 6, 7, 8, 9 to the secondary brushes, b, d, by closing the appropriate switches between the metadynes and the bus-bars. When the speed of the dynamo reaches a point at which there is induced, between the secondary brushes of the transformer metadyne, a voltage equal to the battery voltage, the contactors, 19, 20 are closed, and then the transformer metadyne may be completely disconnected from the bus-bars. While a single transformer metadyne may be used for the starting operation, any number of such metadynes may be connected in parallel through the bus-bars.

Before disconnecting any metadyne from the bus-bars, the stator windings, 21, 22 of the said metadyne must, according to the invention, be regulated at such a value for which no current flows into the armature of the said metadyne. Since the switches connecting the brushes to the bus-bars may be opened without interrupting a current carrying circuit, said switches may be relatively simple in construction as compared to conventional switches.

In lieu of the dynamos 6, 7, 8 and 9, a motor metadyne 36, as shown in Figure 2, may be used. Such a motor metadyne includes primary brushes a, c and secondary brushes b, d. The primary brushes a, c are connected to terminals 37, 38 whereby said motor metadyne may be connected to the bus-bars in place of dynamos 6, 7, 8 and 9 as indicated in Figure 1. The motor metadyne 36 includes a stator winding 39 energized by an independent source of current, now shown; a stator winding 40 connected across brushes b, d, through a rheostat 42, and a stator winding 41 energized by an independent source of current, not shown. The brushes b, d are interconnected through a switch 43, for the purpose hereinafter described.

When switch 43 is open, the current traversing brushes b, d, traverses the winding 40, thus creating a flux opposing and greater than the flux created by the current traversing the armature through the brushes b, d. Thus the winding 40 functions as a hyper-compensator and the motor metadyne then operates in a specific manner as described in application, Serial Number 707,698, filed November 4, 1946, and designated as an alpha motor metadyne.

With the metadyne 36, operating as an alpha motor metadyne, and supplied with current by the generator metadynes 1, 2, 4, the shafts 90, 90a, 90b, 90c may be operated independently of each other, in the manner previously described in connection with dynamos 6, 7, 8 and 9 and additionally the sudden removal of load from said shafts, will not be accompanied by a racing action of the shaft, as would be the case when dynamos are connected to such shafts, since the torque developed by the alpha motor metadyne decreases to zero at a speed slightly above its operational speed. The operational speed of the alpha motor metadyne may be controlled by several means as clearly described in the above mentioned patent application, Ser. No. 707,698, and Figure 2 shows schematically two such means.

The rheostat 42 inserted in the circuit of the hypercompensator 40 provides a mean for controlling the operational speed.

The stator winding 39, energized with a predetermined current, provides another mean for controlling the operational speed of said motor.

Both said means may be used simultaneously.

When the battery 5 is the only source of energy for operating the motors, said motors may take the form of theta motor metadynes. Such a motor metadyne is readily provided by closing the switch 43, as shown in Figure 2, thereby short circuiting the secondary brushes b, d, and rendering the hyper-compensating winding 40, inoperative. The current absorbed by the theta motor metadyne is closely controlled by the ampere turns of the separately energized stator winding 39. The stator winding 39, as shown in the figure, has its magnetic axis coinciding with the flux created by the current traversing the armature through its primary brushes a, c. The other stator winding 41, having its magnetic axis coinciding with the flux created by the current traversing the armature through its secondary brushes b, d, is energized with a predetermined current, thus controlling the starting torque of the motor metadyne. The theta motor metadyne is further described in application, Serial Number 698,372, filed September 20, 1946.

Theta motor metadynes are particularly desirable in this connection, since they allow a satisfactory distribution of the currents among them, even when the speed of the respective shafts varies considerably.

When using the battery 5 as the only source of energy, the theta motor metadyne is advantageous in that the motor metadynes may be deenergized without intensive arcing in the interrupted circuits. This is readily accomplished by regulating the stator winding 39 of the theta motor metadyne so that the current supplied thereto is practically nil at the time when the circuit is to be interrupted.

According to the invention, gamma motor metadynes may be used instead of alpha motor metadynes when the motors are supplied with current by the D generator metadynes 1, 2, 4. Figure 3 shows such a gamma motor metadyne, 13, which may be used in lieu of the dynamo 6. The gamma motor metadyne is distinguished by having its secondary brushes $b$, $d$ short circuited and its stator provided with a primary hypocompensator winding 91 series connected to primary brush $a$ and a stator winding 92 independently energized.

The winding 91 has its magnetic axis coinciding with the flux created by the current traversing its armature through the primary brushes $a$, $c$ while the winding 92 has its magnetic axis coinciding with the flux created by the current traversing the armature through its secondary brushes $b$, $d$. Said gamma motor metadyne is described in detail in application, Serial Number 707,699, filed November 4, 1946.

The use of the gamma motor metadynes has the further advantage of being readily converted into a theta motor metadyne by rearrangement of the connections of the stator windings, the secondary brushes $b$, $d$ remaining short circuited.

If it is desired to use the same motor metadyne regardless of the source of energy, the gamma motor metadyne is adequate when the power is supplied either by the D generator metadynes 1, 2, 4 or by the battery 5.

The rearrangement of the connections of the stator windings of the motor metadynes for the transition from one form to another is readily obtained, when amplifier metadynes are used as the source of current for energizing the stator windings of the said motor metadynes, as clearly explained in the hereinabove mentioned applications.

There are cases where a single shaft is driven by two motors. In this case the two motors are usually connected in parallel.

In such case, one may, according to this invention, connect the corresponding brushes of the motor metadynes coupled to the same shaft. The distribution of the currents between the pair of motor metadynes is adequate. The operation of such interconnected metadyne is explained in application, Serial Number 701,794, filed October 7, 1946, now patent No. 2,570,005.

In Figure 4, a pair of similar motor metadynes 43a, 45 have their respective primary brushes $a$, $c$ interconnected. The respective secondary brushes $b$, $d$ of metadynes 43a, 45 are connected together through switches 46, 47. The secondary brushes $b$, $d$ of each of the metadynes 43a, 45 may be short circuited through switches 44, 48, respectively. Each of the metadynes 43a, 45 is controlled by means of stator windings 49, 51 which are energized by selected currents. The primary brushes of the metadynes 43a, 45 are supplied with energy through terminals 50, 50a.

If the switches 44, 48 are opened, and switches 46 and 47 are closed, the metadynes 43a, 45 may operate as alpha motor metadynes, stator windings being appropriately connected in the manner indicated in Figure 2.

Said metadynes may also be operated as theta motor metadynes by closing switches 44, 48, switches 46, 47 may be opened or closed, the stator windings being appropriately connected as shown in Figure 2, when switch 43 is closed. Said metadynes 43a, 45 may also be operated as gamma motor metadynes by closing switches 44, 48 and by arranging the connections of the stator windings, as shown in Figure 3.

As shown in Figure 5, a transformer metadyne 52 has its primary brushes $a$, $c$ connected across the bus-bars A, C. The primary brushes $a$, $c$ of a motor metadyne 53 are connected between the brushes $a$, $b$ of the transformer metadyne 52, while the primary brushes $a$, $c$ of another motor metadyne 54 are connected between the brushes $c$, $d$ of the metadyne 52. Switches 58, 59 are interposed in the circuits interconnecting the primary brushes of the motor metadynes 53, 54 and the bus-bars A, C.

Switches 58, 59 are opened during the starting period of the motor metadynes 53, 54, the current for energizing said motor metadynes being supplied by the transformer metadyne 52. When the voltage induced in the motor metadynes 53, 54 reaches the value of the voltage of battery 5, which is connected across bus-bars A, C through closed contactor 10, switches 58, 59 are closed. Then, the energy of said motor metadynes 53, 54 is directly supplied by the battery 5 and the transformer metadyne 52 may be rendered inoperative.

For starting the motors while the same are receiving power from the battery, one may use, according to this invention, a transformer metadyne through conversion of any of the D generator metadynes 1, 2, 4 by disconnecting the metadynes from the prime movers through the mechanical coupling and by rearranging the connections of the stator windings, as described in Patent Number 1,969,699.

Figure 5 shows such a transformer metadyne 52.

When the shafts are driven by two motors, one may, according to this invention, use the scheme shown by Figure 6. As shown in the figure, a pair of motor metadynes 53, 54 drive one shaft while a second pair of motors 56, 57 drive the other shaft. Motors 53, 56 are connected in series to each other and connected to the primary brush $a$ and secondary brush $b$ of the generator metadynes 1, 2 through bus-bars A, B. The motors 54, 57 are also connected in series with each other and connected to the brushes $c$, $d$ of the generator metadynes 1, 2 through the bus-bars C, D. Switches 85 and 88 are interposed in the primary brush circuits of the motor metadynes 54, 57 and 53, 56 respectively. Switches 62, 83, 84, 86, 87 and 69 are interposed in circuits connecting the primary brushes $a$, $c$ of the motor metadynes 54, 53, 57, 56 to the bus-bars A, C. The battery 5 is also connected to the bus-bars A, C through contactor 10.

Upon closing switches 85, 88 and opening switches 62, 83, 84, 86, 87 and 69, the motor metadynes form two groups, each group comprising a motor which operates each of the shafts. Thus motor metadynes 53, 56, forming one group, are connected in series with each other and further connected to brushes $a$, $b$ of the generator metadynes 1, 2. Similarly motor metadynes 54, 57 form another group connected in series with each other and connected to brushes $c$, $d$ of the generator motor metadynes.

When the battery 5 is the only source of power for the motor metadynes 53, 54, 56, 57, the motor metadynes are connected in parallel with each other. In this case, the switches 62, 83, 84, 86, 87, 69 are closed and the switches 85, 88 are opened. It is understood that in this case the primetadynes 1, 2 may be disconnected from the bus-bars.

The motor metadynes 53, 54, 56, 57, as shown, have their secondary brushes $b$, $d$ short circuited and they may be operated as gamma motor metadynes when they are energized by the generator metadynes 1, 2 and by suitably interconnecting their stator windings, not shown, as indicated in Figure 3.

When the battery 5 is the sole source of energy, the motor metadynes 53, 54, 56, 57 may be operated as theta motor metadynes, by interconnecting the stator windings, not shown, in the manner indicated in Figure 2, the switch 43 across the secondary brushes $b$, $d$, being closed.

In cases where more than one battery 5 is desirable to provide energy for operating the motors, the scheme shown in Figure 7 may be used. In this case, the bus-bars A, B, C, D are divided into as many groups as there are batteries. As shown in Figure 7, the battery 5 is connected to one set of bus-bars through contactor 10 while the battery 90 is connected to the other set of bus-bars through contactor 60. The respective bus-bars of the two groups may be interconnected by means of switches 79, 80, 81, 82. The generator metadynes are also subdivided into as many groups as there are batteries. Thus metadynes 1, 2 are connected across the bus-bars to which battery 5 is connected and metadynes 3, 4 are connected to the bus-bars to which battery 90 is connected.

A pair of motor metadynes 53, 54 are coupled to a common shaft. Said motor metadynes have their primary brushes $a$, $c$ connected in parallel and are further connected to the bus-bars A, C through switches 62, 64 or to bus-bars B, D through switches 63, 65 of one set of bus-bars. The secondary brushes $b$, $d$ of the motor metadynes 53, 54 may be short circuited through switches 73, 74, respectively and the corresponding brushes connected to each other through switches 71, 72, respectively.

Similarly, a pair of motor metadynes 56, 57 are coupled to a common shaft and their primary and secondary brushes are interconnected to each and to the bus-bar of the other set of bus-bars, in the manner described in connection with motor metadynes 53, 54, by means of switches 67, 68, 69, 70, 75, 76, 77 and 78, which correspond to switches 62, 63, 64, 65, 71, 72, 74, 73, respectively. Furthermore, the pair of parallel connected motor metadynes 53, 54 and the pair of parallel connected motor metadynes 56, 57, may be connected in series with each other through switch 66. The bus-bars A, C are bridged by a contactor 15 for one group of bus-bars and by a contactor 89 for the other group of bus-bars.

When all the generator metadynes 1, 2, 3, 4 and the batteries 5, 90 are coacting to supply energy to all the motor metadynes 53, 54, 56, 57, the voltages of the respective batteries do not coincide, and the rotational speed of the shafts operated by the motor metadyne is relatively high, then the system is operated as follows. Switches 79, 80, 81, 82, 15, 89, 62, 64, 67, 69 and 66 are opened. Switches 10, 63, 71, 72, 65, 60, 68, 75, 76 and 70 are closed. In this case, the motor metadynes 53, 54 are connected to the secondary brushes $b$, $d$ of the generator metadynes 1, 2 and the battery 5 is connected to the primary brushes $a$, $c$ of said generator metadynes. Similarly the motor metadynes 56, 57 are connected to the secondary brushes $b$, $d$ of the generator metadynes 3, 4 and the battery 90 is connected to the primary brushes $a$, $c$ of said generator metadyne.

The motor metadynes may then operate as alpha motor metadynes, the switches 73, 74, 77, 78 being opened and the stator windings, not shown, being connected as indicated in Figure 2, with switch 43 open, or they may operate as gamma motor metadynes, the switches 73, 74, 77, 78 being closed and the stator windings, not shown, being connected as indicated in Figure 3.

It will be apparent that generator metadynes, battery and motor metadynes of each group operate independently of each other.

In the foregoing case, when the shafts coupled to the motor metadynes are to rotate at a relatively low speed, then the system is operated as follows. Switches 79, 80, 15, 89, 62, 64, 65, 67, 68 and 69 are opened. Switches 10, 63, 71, 72, 66, 60, 75, 76 and 70 are closed. In this case the motor metadynes 53, 54 are connected in series with the motor metadynes 56 and 57 and are connected to the secondary brushes $b$, $d$ of the generator metadynes 1, 2, 3, 4. It is apparent that such series connection of the motor metadynes is effective to reduce the rotational speed of the motor metadynes with the relatively smaller current from the generator metadynes.

When the motor metadynes are to be supplied with energy by generator metadynes 1, 2, 3, 4 exclusively, the batteries 5, 90 are disconnected from the respective group of bus-bars by means of contactors 10, 60 and the contactors 15, 89 are closed. In this case the generator metadynes are effective to supply the necessary energy for the motor metadynes which may be operated as alpha or gamma motor metadynes in the manner previously described.

When the batteries 5, 90 form the exclusive source of energy for the motor metadynes, then the operation of the system is as follows. Switches 79, 80, 15, 89, 63, 65, 66, 68 and 70 are opened. Switches 62, 64, 67, 69, 73, 74, 77 and 78 are closed. The remaining switches may be left opened or closed. In this case the motor metadynes 53, 54 are directly connected to battery 5 and the motor metadynes 56, 57 are directly connected to the battery 90.

When the batteries 5, 90 are the exclusive source of energy, the motor metadynes are most effective when operated as theta motor metadynes, in which case the stator windings, thereof, not shown, are connected as indicated in Figure 2, with switch 43 closed.

In Figure 8 is shown a system similar to that of Figure 7, except as hereinafter indicated. The motor metadynes 53, 56 are connected in series with each through their primary brushes $a$, $c$, with a switch 88 interposed therebetween, said primary brushes being connected to the bus-bars A, C, of one group of bus-bars through switches 86, 87, respectively. Similarly, motor metadynes 53, 54 are connected in series with each other through their primary brushes $a$, $c$, with a switch 85 interposed therebetween, said primary brushes being connected to the bus-bars A, C of the other group of bus-bars through switches 84, 83, respectively. It is apparent that in this case a motor metadyne coupled to one shaft, is series connected to a motor metadyne coupled to the other shaft. The series connected motor metadynes forming one branch of the system is connected in parallel to the series connected motor metadynes forming another branch of the system.

When switches 85, 88 are closed and switches 83, 84, 86, 87 are opened, the motor metadynes 53, 56 and 54, 57 are connected in series respectively and to the secondary brushes b, d of the generator metadynes 1, 2, 3, 4. When switches 85, 88 are opened and switches 83, 84, 86, 87 are closed, the motor metadynes 53, 56 and 54, 57 are connected in parallel to the batteries, thus providing selective operation of the motor metadynes by means of the generator metadynes or the batteries. Also, the motor metadyne may be operated by means of the generator metadynes and batteries, in the manner previously described in connection with Figure 7, the switches 85, 88 being operated similarly as switch 66 in Figure 7. Also, switches 83, 84 are operated in the same manner as switches 62, 63 and similarly, switches 86, 87 are operated in the same manner as switch 69.

I claim:

1. An electric power system comprising electric motor means, a storage battery and a dynamo electric machine of the generator metadyne type, said metadyne comprising a pair of primary brushes and a pair of secondary brushes displaced therefrom, and at least two stator windings having their magnetic axes displaced from one another, means for rotating said metadyne, a circuit including the secondary brushes of said metadyne, a circuit including said battery, and switch means for selectively connecting said motor means to one of said circuits, circuit means for selectively connecting said primary brushes to said second mentioned circuit, said stator windings being operative to selectively control the operation of said metadyne for each of said circuits.

2. A system as in claim 1, and further including, means for connecting said motor means between one of the primary brushes and one of the secondary brushes of said generator metadyne.

3. A system as in claim 1, and including means for short circuiting said primary brushes, when connecting said motor means to said first mentioned circuit.

4. An electric power system comprising a plurality of motor metadynes, a generator metadyne including primary and secondary brushes, means for rotating said generator metadyne and a storage battery, a circuit including said generator metadyne, a circuit including said generator metadyne and said battery, means for selectively connecting said motor metadynes to one of said circuits, each of said motor metadynes comprising an armature, a pair of non-consecutive primary brushes and a pair of secondary brushes, and a plurality of stator windings, means for connecting one of said stator windings between the secondary brushes of said motor metadyne, said last mentioned stator winding creating a flux opposing and greater than the flux created by the current traversing the armature through the secondary brushes of said motor metadyne and another of said stator windings having its magnetic axis coinciding with the magnetic axis of the first mentioned stator winding, means for energizing said second mentioned stator winding with a predetermined current, means for connecting the primary brushes of said motor metadynes in series with each other, and in series with one of the secondary brushes of said generator metadyne, said second mentioned circuit comprising means for connecting the primary brushes of said generator metadyne to said battery, and said first mentioned circuit comprising means for short circuiting the primary brushes of said generator metadyne.

5. An electric power system as in claim 1, said motor means comprising a plurality of motor metadynes, each of said motor metadynes comprising an armature, a pair of non-consecutive primary brushes, a pair of short circuited secondary brushes and a plurality of stator windings, one of said motor metadyne stator windings being connected in series with the primary brushes of said motor metadyne and having its magnetic axis coincident with the flux created by the current traversing the armature through its primary brushes and creating a flux opposing the flux created by the current traversing the armature through its primary brushes, another of said motor metadyne stator windings having its magnetic axis coincident with the flux created by the current traversing the armature through its secondary brushes, means for energizing said second mentioned stator winding with a predetermined current, means for short circuiting the primary brushes of said generator metadyne, means for connecting the primary brushes of said motor metadynes in series with each other and in series with a secondary brush of said generator metadyne, means for connecting the primary brushes of said motor metadynes to said battery.

6. An electric power system comprising a plurality of motor metadynes and a storage battery, each of said motor metadynes comprising an armature, a pair of non-consecutive primary brushes, a pair of short circuited secondary brushes and a plurality of stator windings, one of said stator windings having its magnetic axis coincident with the flux created by the current traversing the armature through its primary brushes, means for energizing said last mentioned stator winding with a predetermined current, another of said stator windings having its magnetic axis coincident with the flux created by the currents traversing the armature through its secondary brushes, means for energizing said second mentioned stator winding with a predetermined current, and means for connecting the primary brushes of said motor metadynes to said battery.

7. An electric power system as in claim 1, wherein said motor means comprises a plurality of pairs of motor metadynes, each of the motor metadynes comprising an armature, a set of primary brushes and a set of secondary brushes, means for coupling each pair of motor metadynes together, means for connecting together the corresponding respective brushes of the motor metadynes in each pair of motor metadynes, means for connecting the primary brushes of said pairs of motor metadynes in series with each other, means for connecting the interconnected primary brushes of each of said pairs of motor metadynes in series with one of the secondary brushes of said generator metadyne, and means for connecting the interconnected primary brushes of each pair of motor metadynes to said second mentioned circuit.

8. An electric power system comprising a plurality of electric motors, a metadyne comprising a set of primary brushes and a set of secondary brushes, a prime mover, means for detachably coupling said metadyne to said prime mover, and a storage battery, a circuit including said metadyne, a circuit including said metadyne and said battery and a circuit including said battery, means for selectively connecting said motors to said circuits, said first and second circuits including means for connecting said motors in series with each other and in series with the secondary brushes of said metadyne, and said metadyne being coupled to said prime mover, whereby said metadyne operates as a generator metadyne, said third circuit including means for connecting each of said motors in series with a secondary brush of said metadyne, means for connecting the primary brushes of said metadyne to said battery and said metadyne being detached from said prime mover, whereby said metadyne operates as a transformer metadyne.

9. An electric power system as in claim 1, said motor means comprising a plurality of pairs of motors, each pair of motors having a common shaft, means for connecting one motor in each pair of said motors in series with each other, means for connecting the other motor in each pair of said motors in series with each other and circuit means for selectively connecting the interconnected motors to said circuits.

10. An electric power system comprising a plurality of electric motors, a plurality of generator metadynes, each of said metadynes including a set of primary brushes and a set of secondary brushes, means for rotating each of said metadynes, and a plurality of storage batteries, means for interconnecting the corresponding secondary brushes of said generator metadynes, means for connecting the primary brushes of some of said metadynes to one of said batteries, means for connecting the primary brushes of other of said metadynes to another of said batteries and means for connecting said motors to the secondary brushes of said metadynes.

JOSEPH MAXIMUS PESTARINI.

REFERENCES CITED

The following references are of record in the file of this patent:

UNITED STATES PATENTS

| Number | Name | Date |
|---|---|---|
| 2,019,025 | Spear et al. | Oct. 29, 1935 |
| 2,049,389 | Pestarini | July 28, 1936 |
| 2,217,432 | Cook | Oct. 8, 1940 |